(12) United States Patent
Sjong

(10) Patent No.: US 8,771,462 B2
(45) Date of Patent: Jul. 8, 2014

(54) COATED THERMOPLASTIC ARTICLES WITH REMOVABLE COATING

(75) Inventor: Angele Sjong, Louisville, CA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/383,358

(22) PCT Filed: Aug. 10, 2011

(86) PCT No.: PCT/US2011/047292
§ 371 (c)(1),
(2), (4) Date: Jan. 10, 2012

(87) PCT Pub. No.: WO2013/022448
PCT Pub. Date: Feb. 14, 2013

(65) Prior Publication Data
US 2013/0299097 A1    Nov. 14, 2013

(51) Int. Cl.
*B32B 38/10* (2006.01)
(52) U.S. Cl.
USPC ........... 156/712; 156/711; 156/919; 156/927; 29/403.4; 29/426.4; 428/448
(58) Field of Classification Search
USPC ......... 156/711, 712, 927, 939, 919; 29/403.3, 29/403.4, 426.4; 428/448
See application file for complete search history.

(56) References Cited

U.S. PATENT DOCUMENTS

| | | | |
|---|---|---|---|
| 2,543,557 A | 2/1951 | Smith | |
| 4,006,271 A | 2/1977 | French et al. | |
| 4,349,603 A | 9/1982 | Kameyama et al. | |
| 4,747,901 A | 5/1988 | Becker et al. | |
| 5,143,766 A | 9/1992 | Wenz et al. | |
| 5,567,764 A | 10/1996 | Brasseur et al. | |
| 6,607,826 B1 | 8/2003 | Hatch | |
| 6,694,588 B2 * | 2/2004 | Susa et al. | 29/403.3 |
| 6,722,023 B2 * | 4/2004 | Mori et al. | 29/791 |
| 7,140,108 B2 * | 11/2006 | Kobayashi et al. | 29/897.2 |
| 8,168,511 B2 * | 5/2012 | Nishiki et al. | 438/458 |

(Continued)

FOREIGN PATENT DOCUMENTS

| | | | |
|---|---|---|---|
| CA | 2428093 C | * | 1/2010 |
| EP | 1031589 | | 8/2005 |

(Continued)

OTHER PUBLICATIONS

International Search Report and Written Opinion, issued in International Patent Application No. PCT/US2011/047292, mailed Oct. 24, 2011, 11 pages.

(Continued)

*Primary Examiner* — Mark A Osele
(74) *Attorney, Agent, or Firm* — Pepper Hamilton LLP

(57) ABSTRACT

The present disclosure generally describes techniques suitable for use in the construction or recycling of composite materials, such as thermoplastics. A coated thermoplastic article may comprise a thermoplastic portion coupled to a supramolecular polymer interface layer, with a coating layer applied to a surface of the supramolecular polymer interface layer. Application of heat to the coated thermoplastic article may cause the supramolecular polymer interface layer to undergo a phase change, allowing the coating layer to be removed from the thermoplastic portion. Application of force to the coated thermoplastic article may enhance the removal of the coating layer. Embodiments of methods, compositions, articles and/or systems may be disclosed and claimed.

18 Claims, 5 Drawing Sheets

(56) References Cited

U.S. PATENT DOCUMENTS

| | | |
|---|---|---|
| 2003/0072948 A1 | 4/2003 | Krepski et al. |
| 2008/0318055 A1 | 12/2008 | Fillion et al. |
| 2010/0247824 A1 | 9/2010 | Chang et al. |

FOREIGN PATENT DOCUMENTS

| | | |
|---|---|---|
| GB | 1298857 | 12/1972 |
| JP | 10309742 | 11/1998 |
| JP | 2002370313 | 12/2002 |
| WO | 0125343 | 4/2001 |

OTHER PUBLICATIONS

Fabbri, P. et al., "Enhancing the Scratch Resistance of Polycarbonate With Poly(Ethylene Oxide)-Silica Hybrid Coatings," Advances in Polymer Technology, 2008, vol. 27, No. 2, pp. 117-126.

Lee, S. H. et al., "Organic-Inorganic Hard Coating Layer Formation on Plastic Substrate by UV Curing Process," Macromolecular Research, 2010, vol. 18, No. 1, pp. 40-46.

Hwang, D. K. et al., "Scratch Resistant and Transparent UV-Protective Coating on Polycarbonate," Journal of Sol-Gel Science and Technology, 2003, vol. 26, Nos. 1-3, pp. 783-787.

De Greef, T. F. A. et al., "Supramolecular Polymerization," Chem. Rev., 2009, vol. 109, No. 11, pp. 5687-5754.

Schottner, G., "Hybrid Sol-Gel-Derived Polymers: Applications of Multifunctional Materials," Chem. Mater, 2001, vol. 13, pp. 3422-3435.

Chen, D., "Anti-reflection (AR) Coatings made by Sol-Gel Processes: A Review," Solar Energy Materials & Solar Cells, 2001, vol. 68, Nos. 3-4, pp. 313-336.

Karatas, S. et al., "Preparation and characterization of sol-gel derived UV-curable organo-silica-titania hybrid coatings," Progress in Organic Coatings, Sep. 2007, vol. 60, No. 2, pp. 140-147.

Wouters, M. E. L. et al., "Transparent UV curable antistatic hybrid coatings on polycarbonate prepared by the sol-gel method," Progress in Organic Coatings, 2004, vol. 51, No. 4, pp. 312-320.

Han, Y. et al., "Scratch resistance and adherence of novel organic-inorganic hybrid coatings on metallic and non-metallic substrates," Surface & Coatings Technology, Jun. 2009, vol. 203, No. 19, pp. 2871-2877.

Han, Y. et al., "Characterisation of organic-inorganic hybrid coatings deposited on aluminium substrates," Surface & Coatings Technology, 2008, vol. 202, pp. 1859-1868.

* cited by examiner

COATED THERMOPLASTIC ARTICLES WITH REMOVABLE COATING

RELATED APPLICATIONS

This application is a 35 USC 371 national phase entry of PCT/US2011/047292, filed Aug. 10, 2011, which is incorporated herein by reference in its entirety.

BACKGROUND

Unless otherwise indicated herein, the materials described in this section are not prior art to the claims in this application and are not admitted to be prior art by inclusion in this section.

Engineered thermoplastic articles are typically coated with another polymer to improve texture, color and longevity. Recycling coated thermoplastic articles presents a challenge since the coating typically needs to be removed in order to obtain quality recycled products. When the coating is not removed, the recycled product typically has reduced commercial value and/or is used in low-value applications such as synthetic wood products.

Applied coatings may confer UV-protection, scratch resistance and support transparency. Hard coatings have been applied by a thermal curing process using e.g., silicone compounds for coating layer functionalization. More recently, organic-inorganic hybrid coatings by UV-curing process have increasingly been used.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
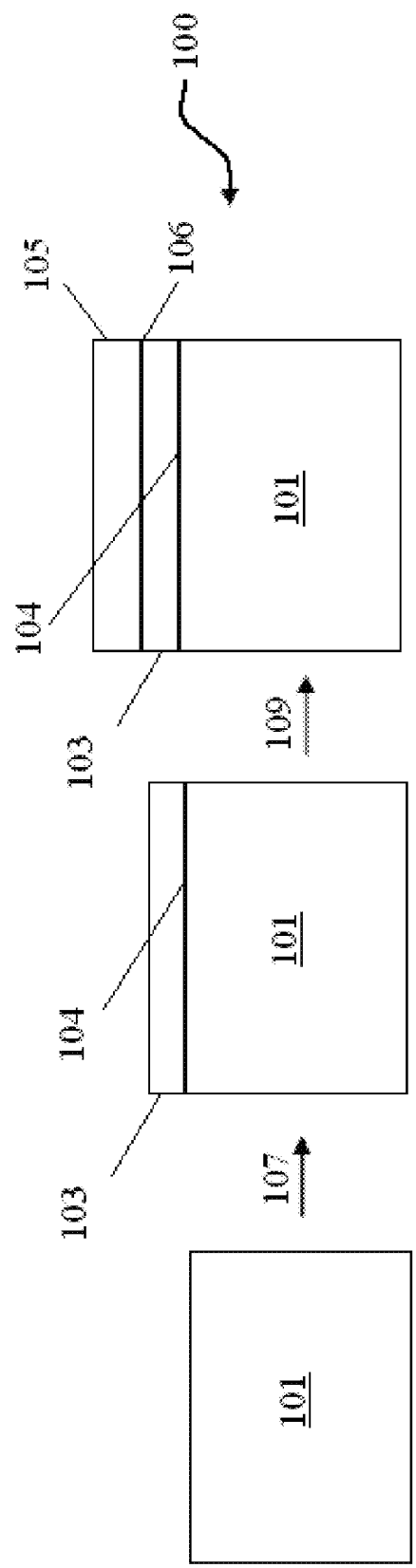
FIG. 1 is a block diagram of a coating process for forming a coated thermoplastic article with a removable coating and an interface layer.

The following description sets forth various examples along with specific details to provide a thorough understanding of claimed subject matter. It will be understood by those skilled in the art that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Methods, apparatus, articles, and systems related to coated thermoplastic articles with removable coatings are described. As described herein, thermoplastic objects used in automotive and other industries may be coated with a removable coating that is coupled to the thermoplastic object by an interface, resulting in a coated thermoplastic article with a removable coating. The thermoplastic object may be separated from the removable coating by application of heat and/or mechanical force. The applied heat may cause the interface to change from a solid phase to a low-melt viscosity phase upon heating. Suitable interfaces, as well as the application of interfaces and coatings to the thermoplastic objects and removal of interfaces and coatings from the coated thermoplastic articles, are illustrated and further described in the accompanying text below.

The present disclosure describes coated thermoplastic articles with a removable coating coupled to a thermoplastic object via an interface. An example of such a coated thermoplastic article may include a thermoplastic object, a supramolecular polymer interface layer disposed on an outer surface of the thermoplastic object, and a coating layer coated on the supramolecular polymer interface layer. The supramolecular polymer interface layer may have a first melt temperature and the thermoplastic object may have a second melt temperature, with the second melt temperature being greater than the first melt temperature. The supramolecular polymer may include a number of functionalized monomers with at least one flexible linker and/or an alkoxy group (e.g., a silicon alkoxy group). The alkoxy group may be coupled to the coating layer. In some examples, the coating layer may include an organic-inorganic coating layer.

The present disclosure also describes methods for making a coated thermoplastic article with a removable coating and an interface layer. Some example methods may include applying a supramolecular polymer to an outer surface of a thermoplastic object, cooling the applied supramolecular polymer to form an interface layer of the thermoplastic object, and applying a coating to the interface layer. The supramolecular polymer may be applied to the thermoplastic object at a first application temperature. The first application temperature may be equal to, or higher than, the melt temperature of the supramolecular polymer. The first application temperature may also be lower than the melt temperature of the thermoplastic object. The applied supramolecular polymer may then be cooled to a second application temperature lower than the melt temperature of the supramolecular polymer to form the interface layer. The thermoplastic object may have a melt temperature higher than the melt temperature of the supramolecular polymer.

The coating may include an organic-inorganic hybrid coating. The coating may be applied by applying a colloidal suspension to the interface layer. The colloidal suspension may include silica. Some methods may include exposing the colloidal suspension on the solid interface to UV light. In some methods, applying the supramolecular polymer may include spraying the supramolecular polymer at the first application temperature onto the outer surface of the thermoplastic object. Similarly, applying the colloidal suspension to the interface layer may include spraying the interface layer with the colloidal suspension. The supramolecular polymer may include a plurality of functionalized monomers with at least one flexible linker and/or an alkoxy group. The alkoxy group may bond to the coating layer in response to exposure of the colloidal suspension on the solid interface to UV light.

The present disclosure also describes method for removing a coating layer from a coated thermoplastic article. The coated thermoplastic article may include a thermoplastic portion (i.e., a thermoplastic object), a coating layer, and a supramolecular polymer interface coupling the coating layer to an outer surface of the thermoplastic object. The thermoplastic portion may have a first melt temperature, and the supramolecular polymer may have a second melt temperature that is lower than the first melt temperature. Some example methods may include applying heat to the coated thermoplastic article and applying force to the coating layer of the coated thermoplastic article. Applying heat to the coated thermoplastic article may include heating the supramolecular polymer interface to a third temperature equal to or greater than the second melt temperature and less than the first melt temperature. In some examples, applying heat to the coated thermoplastic article may include applying electromagnetic radiation to the supramolecular polymer interface, such as by exposing the coated thermoplastic article to one or more laser beams. Alternatively, applying heat to the coated thermoplastic article may include applying a heated fluid to the coated thermoplastic article. Applying force to the coating layer may include applying mechanical force to uncouple the coating layer from the supramolecular polymer interface and/or thermoplastic portion. In some examples, force may be applied along a plane of the supramolecular polymer interface. In other examples, applying heat and mechanical force to the coated thermoplastic article may include tumbling the coated thermoplastic article in a heated chamber.

As used herein, "thermoplastic" may be any polymer that can be softened and remolded/reshaped after an initial molding/shaping. Thermoplastic may include any polymer that can be softened by heating and hardened by cooling. Thermoplastic may be a polymer that exhibits viscous flow at temperatures above the glass transition temperature of the polymer, or exhibits viscous flow at temperatures above a melt temperature (e.g. crystalline melting temperature) of the polymer. Examples of thermoplastics include, but are not limited to, polyethylene, polypropylene, polyvinyl chloride, acrylonitrile butadiene styrene copolymer, acrylonitrile, acrylonitrile styrene acrylic ester copolymer, polyamide, polybutylene terephthalate, polymethyl methacrylates, polycarbonate, polycetals, polyphenylene ether, polyether sulfone, unsaturated polyester resins, and polyurethane.

As used herein, "thermoplastic object" may be used in reference to a layer, a material, a component, or other item that comprises one or more thermoplastic surface areas, such as a solid or hollow thermoplastic item, a thermoplastic part of an item, a thermoplastic coating on an article/object, or a thermoplastic sheet/film. In contrast, the term "coated thermoplastic article" may be used in reference to articles that include a "thermoplastic object," an interface layer, and a "coating" or "coating layer." A "thermoplastic object" that is part of a "coated thermoplastic article" may also be referred to as a "thermoplastic portion" of the coated thermoplastic article.

As used herein, "polymer" may be any material with a number of molecules having two or more structurally similar/identical functionalized monomers coupled by a chemical bond. Chemical bonds may be covalent bonds, ionic bonds, hydrogen bonds, van der Waals' interactions and/or any other chemical bond known in the art. A "monomer" of a polymer, as used herein, may be any molecule capable of forming a chemical bond with at least two additional similar/identical molecules to form a sequence of repeating units. "Monomer" may encompass, but is not limited to, monomeric species such as olefins, propylenes, ethers, styrenes, ethylenes, fluoroethylenes, tetrafluoroethylenes, ethylene propylenes, esters, carbonates, urethanes, vinyl chlorides, vinyl chloride acetates, amides, imides, acetals, methylpentenes, methyl methacrylates, sulfones, urethanes, acrylics, styrene acrylics, acrylonitrile, and any other monomeric species known in the art. "Monomer" may also encompass monomeric species with structures that are based on, or are modifications of, one or more of any of the named or unnamed monomeric species above.

"Polymer" as used herein may also include any and all species of "copolymer," which may be any polymer having at least two different monomeric species A and B (e.g. ether and propylene), which may be arranged in any way (e.g. alternating A and B monomers, alternating A and B polymers, repeated sequences, randomly disposed, block arrangements, etc.). "Polymer" as used herein may encompass "terpolymer," which may be any polymer having at least three different monomeric species, and any molecule having four or more different monomer species in any arrangement. "Polymer" as used herein may encompass polymers with any and all secondary, tertiary, and/or quaternary structures, or side groups.

As used herein, a "functionalized monomer" may be a monomer that includes a flexible organic chain (i.e., a linker) coupled to one or more end groups capable of forming a noncovalent bond with an end group of another functionalized monomer to form a main chain of a supramolecular polymer. Examples of end groups include, but are not limited to, ureido-s-triazine, ureido-s-pyrimidinone, ureido-pyrimidin-4-ol, other ureidopyrimidinone, ureidopyridopyrimidinone, or urazole units, and/or guanine or guanosine derivatives. A functionalized monomer may have two end groups, each of which may form one or more noncovalent bonds with an end group of another functionalized monomer of the main chain. The other functionalized monomer may be an identical species or different species. Similarly, a functionalized monomer with two different end groups may form noncovalent bonds with two different functionalized monomers having corresponding end groups.

As used herein, the term "supramolecular polymer" may refer to any polymer in which linear main chains are formed by repeating units (i.e., functionalized monomers) that self-assemble through noncovalent interactions ("intrachain bonding"), as opposed to conventional polymers in which the monomers of the main chain are coupled by one or more covalent bonds. The strength of the intrachain bonding may exceed the strength of the noncovalent interactions between main chains ("interchain bonding"). Noncovalent interactions may include, but are not limited to, electrostatic forces, donor-acceptor interactions, coulombic interactions, coordination, pi-pi interactions, hydrogen bonds, ionic bonds, and/or van der Weals' interactions. A "supramolecular polymer" may have a first phase at temperatures equal to or exceeding the melt temperature of the supramolecular polymer and a second phase at lower temperatures. The first phase may be a low-viscosity liquid phase or a semi-solid phase, and the second phase may be a solid phase.

Supramolecular polymers may be main-chain, side-chain, branched, and/or cross-linked. Main-chain supramolecular polymers may be homopolymers formed from functionalized monomers with two identical end groups. Alternatively, main-chain supramolecular polymers may be formed from functionalized monomers or copolymers with different end groups. In side-chain supramolecular polymers, some molecules may have a single end group that is attached to a complementary group on the main chain of a traditional covalent polymer. Branched (two-dimensional) and cross-linked supramolecular polymers may be formed from various combinations of linear molecules (e.g., linkers) and a variety of different subunits (e.g., functionalized monomers/copolymers) that provide three or more equivalent end groups. In some examples, the length of the main chains may be controlled or adjusted by adding monofunctional units (i.e., "chain stoppers") that interact with one or more end groups of the functionalized monomers to block further chain growth. The average degree of polymerization may be adjusted by using end groups that interact noncovalently at varying strengths (e.g., using end groups with a relatively high association constant to obtain a supramolecular polymer of increased molecular weight) and/or by adjusting the concentration of the colloidal suspension/solution.

Examples of end groups include ureidopyrimidinone, 2,6-bis(1'-methylbenzimidazolyl) pyridine (Mebip), and derivatives thereof.

As used herein, a "bonding interface" may be a surface or location at which two layers, objects or substances are physically/chemically bonded. For example, a bonding interface may be a common boundary between two layers, objects or substances that are directly coupled at the common boundary (e.g., by a chemical bond). An "interface layer" may be a layer, object or substance that forms a boundary between two layers and may be directly coupled to one or both layers by a bonding interface. For example, a thermoplastic object may be directly coupled to an interface layer along a first bonding interface, and the interface layer may be directly coupled to a coating layer along a second bonding interface with the interface layer disposed between the thermoplastic object and the coating.

As used herein, "coating" or "coating layer" may refer to UV-curable silicone coatings. "Coating" may encompass any of the numerous available hard silica coatings applied on commodity plastics. In some examples, a coating may be formed at least in part by a sol-gel process. A coating may be an organic-inorganic coating, also referred to as a "hybrid coating" or "organic-inorganic hybrid coating," may be created using one or more inorganic components such as colloidal silica, tetraethylorthosilicate (TEOS), or tetramethylorthosilicate (TMOS), and one or more organic components such as 3-glycidoxypropyl trimethoxysilane (GPTMS), methacryloxypropyl trimethoxysilane (MPTMS), vinyltriethoxysilane (VTES), or methyltriethoxysilane (MTES). In some examples, one or more "hybrid materials" (i.e., organic materials chemically bonded to inorganic materials) may be used to make a coating. Examples of such hybrid materials include but are not limited to ORMOSILs (organically modified silica), ORMOCERs (organically modified ceramics), and/or CERAMERs (ceramic polymers).

An organic-inorganic coating may be formed from a colloidal suspension of chemically bonded organic and inorganic materials that undergoes a sol gel process to form silicon-based polymeric structures as interpenetrating networks in an organic binder system. The sol (i.e., a colloidal suspension of inorganic particles in a liquid) may include one or more silicon-based precursors such as alkoxy silanes. The hydrolysis of the alkoxy silanes (e.g., with an acid or alkaline catalyst) may cause polycondensation reactions that result in the formation of a silicon-based sol within the organic binder. The size of the sol particles, the cross linking within the particles and the stability of the sol may vary depending on variables such as pH and the ratio of water to alkoxy silane.

The sol may be a low viscosity liquid that becomes a three-dimensional network (i.e., a gel) as a result of cross linking. Polycondensation reactions may occur during preparation of the organic-inorganic coating, after application of the organic-inorganic coating on the substrate (e.g., thermoplastic object), and/or during a curing process. In some examples, one or more photoinitiators may be added to the sol. Photoinitiators for use in UV curing systems are known in the art. Examples of photoinitiators may include, but are not limited to, photoinitiators of the alpha hydroxyketone family (e.g., Irgacure 184, Irgacure 2959 and Ciba® Darocur 1173) and photoinitiators of the bis acyl phosphine oxide (BAPO) type (e.g., Irgacure 819) or mono acyl phosphine oxide (MAPO) type. The photoinitiators may cause crosslinking of components within the sol in response to exposure to UV light.

For example, an organic-inorganic coating may be any of the coatings described in the following references: Lee, S. H. et. al, "Organic-Inorganic Hard Coating Layer Formation on Plastic Substrate by UV Curing Process," *Macromolecular Research*, Vol. 18, No. 1, pp 40-46 (2010); Karatas et. al, "Preparation and characterization of sol-gel derived UV-curable organo-silica-titania hybrid coatings," *Progress in Organic Coatings* 60, pp 140-147 (2007); Wouters, M. E. L. et. al., "Transparent UV curable antistatic hybrid coatings on polycarbonate prepared by the sol-gel method," *Progress in Organic Coatings* 51, pp 312-320 (2004); Han, Y. et al., "Scratch resistance and adherence of novel organic-inorganic hybrid coatings on metallic and non-metallic substrates," *Surface & Coatings Technology* 203, pp. 2871-2877 (2009); Han, Y. et al., *Surface & Coatings Technology* 202, pp. 1859-1868 (2008); Schottner, G., "Hybrid Sol-Gel-Derived Polymers: Applications of Multifunctional Materials," *Chem. Mater.* 13, pp. 3422-3435 (2001); and Chen, D. "Anti-reflection (AR) coatings made by sol-gel processes: A review," *Solar Energy Materials & Solar Cells* 68 313-336 (2001).

As further described below, a supramolecular polymer interface layer may be applied to a thermoplastic object before adding a coating layer. The coating layer may be subsequently removed by applying heat to the supramolecular polymer interface, which causes the supramolecular polymer to revert to a low-viscosity liquid, gel, or semi-solid state. Thus, removal of the coating layer from the thermoplastic object (e.g., to recycle the thermoplastic object) may be accomplished at a relatively low cost, and possibly without the use of chemical solutions, which may be toxic.

FIG. 1 illustrates a coating process for forming a coated thermoplastic article with a removable coating and an interface layer, in accordance with various embodiments of the present disclosure. As shown, coated thermoplastic article 100 may include thermoplastic object 101, interface layer 103, and coating layer 105.

Thermoplastic object 101 may be a sheet of thermoplastic material, an inner/outer wall of an object constituted with thermoplastic, or any object constituted with thermoplastic. As described above, thermoplastic object 101 may include one or more polymers that exhibit leathery, rubbery or viscous flow at temperatures above a glass transition temperature or exhibit viscous flow at temperatures above a melt temperature and/or crystalline melt temperature. Thermoplastic object 101 may be constructed from one or more polymers that may be re-melted and/or re-shaped after an initial molding/shaping. One or more of the polymers of thermoplastic object 101 may be in a semi-crystalline and/or amorphous solid state. In some examples, thermoplastic object 101 may include polypropylene and/or polyether. Thermoplastic object 101 may be any shape and/or size, and may be configured as a component of an automotive/electronics apparatus.

Supramolecular polymer interface layer 103 may include any supramolecular polymer (e.g., UPy-modified poly(ethylene-co-butylene)). Supramolecular polymer interface layer 103 may be applied as a low-viscosity solution to an outer surface of thermoplastic object 101 (application process represented by arrow 107). Optionally, thermoplastic object 101 may be cleaned with an appropriate solvent such as alcohol before the application. Supramolecular polymer interface layer 103 may be applied as a low-viscosity solution at a first application temperature. The low-viscosity solution includes functionalized monomers (see e.g., FIG. 3). The low-viscosity solution can be prepared from a pre-made solid or semi-solid supramolecular polymer by heating the supramolecular polymer to a first application temperature. Alternatively, the low-viscosity solution can be prepared by adding functionalized monomers (i.e., monomers that can self-assemble into a supramolecular polymer below the melt temperature of the supramolecular polymer) to a solvent.

The first application temperature may be equal to or greater than the melt temperature of the supramolecular polymer ("first melt temperature") and less than the melt temperature of thermoplastic object 101 ("second melt temperature"). The first melt temperature may be within a range of 50° C. to 120° C., 60° C. to 110° C., 70° C. to 100° C., 50° C. to 60° C., 60° C. to 70° C., 70° C. to 80° C., 80° C. to 90° C., 90° C. to 100° C., 100° C. to 110° C., 110° C. to 120° C., 120° C. to 130° C., or 130° C. to 180° C. Specific examples of the first melt temperature include about 50° C., about 60° C., about 70° C., about 80° C., about 90° C., about 100° C., about 110° C., about 120° C., about 130° C., about 140° C., about 150° C., about 160° C., about 170° C., about 180° C., and ranges between any two of these values. The first application temperature may be within a range of 60° C. to 110° C., 70° C. to 100° C., 50° C. to 60° C., 60° C. to 70° C., 70° C. to 80° C., 80° C. to 90° C., 90° C. to 100° C., 100° C. to 110° C., 110° C. to 120° C., 120° C. to 130° C., 130° C. to 140° C., 140° C. to 150° C., 150° C. to 160° C., 160° C. to 170° C., 170° C. to 180° C., 180° C. to 190° C., 190° C. to 200° C., 200° C. to 220° C., 200° C. to 250° C., 250° C. to 300° C., or 300° C. to 400° C. Specific examples of the first application temperature include about 60° C., about 70° C., about 80° C., about 90° C., about 100° C., about 110° C., about 120° C., about 130° C., about 140° C., about 150° C., about 160° C., about 170° C., about 180° C., about 190° C., about 200° C., about 250° C., about 300° C., about 350° C., about 400° C., and ranges between any two of these values. The viscosity of the supramolecular polymer at the first application temperature may be within the range of 1-2 Pa s, 2-3 Pa s, 3-4 Pa s, 4-5 Pa s, 5-6 Pa s, 6-7 Pa s, 7-8 Pa s, 8-9 Pa s, 9-10 Pa s, 10-12 Pa s, 12-15 Pa s, 1-8 Pa s, 8-15 Pa s, or 15-25 Pa s. Specific examples of the viscosity include about 1 Pa s, about 2 Pa s, about 3 Pa s, about 4 Pa s, about 5 Pa s, about 6 Pa s, about 7 Pa s, about 8 Pa s, about 9 Pa s, about 10 Pa s, about 12 Pa s, about 15 Pa s, about 20 Pa s, about 25 Pa s, and ranges between any two of these values.

The solution may be applied by spraying, dipping, or spin-coating, by a meniscus coating process and/or lateral flow coating process, or by any other suitable application technique. The applied solution may then be cooled to a second application temperature below the melt temperature of the supramolecular polymer.

The functionalized monomers of the supramolecular polymer may include at least one flexible organic chain (a "linker") with one or more alkoxy groups, such as alkoxy silicon groups. The flexible linkers may be coupled (e.g., by one or more covalent bonds) to one or more end groups capable of coordinating end-on-end with end groups of other functionalized monomers via noncovalent bonds, resulting in polymerization (see e.g., FIGS. 3 and 4). The polymerization of the functionalized monomers, solidification, and bonding to thermoplastic object 101 along first bonding interface 104 may proceed as the solution cools to the second application temperature, resulting in the formation of supramolecular polymer interface layer 103. In some examples, supramolecular polymer interface layers 103 may be sequentially applied to a series of thermoplastic objects 101 as the thermoplastic objects are conveyed during a manufacturing process.

Coating layer 105 may be applied over supramolecular polymer interface layer 103 (application process represented by arrow 109). Coating layer 105 may be an organic-inorganic hybrid coating, such as a hard silica coating, and may be applied as a colloidal suspension by spraying, dipping, spin-coating, or rolling, by a meniscus coating process and/or lateral flow coating process, or by any other suitable application technique. The applied colloidal suspension may undergo a sol-gel process to form a gel on thermoplastic object 101. Application of coating layer 105 may include a UV curing process in which the sol-gel may be exposed to UV light, resulting in the formation of a hard silica coating. Coating layer 105 may bind to the alkoxy groups of the linkers of polymer interface layer 103 along second bonding interface 106 during the sol-gel process, during the UV curing process, or both. Again, coating layer 105 may be applied to a series of thermoplastic objects 101 after the formation of interface layer 103 as the thermoplastic objects are conveyed during a manufacturing process.

As indicated above, one or more photoinitiators may be included in the colloidal suspension used to form coating layer 105. Photoinitiators and combinations thereof may be selected based on factors such as resin system chemistry (e.g., UPES, epoxy acrylate, urethane acrylate), the type of functionalized monomers (e.g., monofunctional or multifunctional acrylate monomers) or other monomers used, UV lamp type and orientation, desired curing speed, and desired coating layer properties, which may be usage application dependent. Combinations of photoinitiators may be used, for example, in relatively thick coating layers and/or for faster curing.

The colloidal suspension used to form the coating layer may include a first photoinitiator that may be responsive to longer wavelengths of UV light (e.g., above 430 nm) and a second photoinitiator that may be responsive to shorter wavelengths of light (e.g., between 200 nm and 430 nm), and the UV curing process may include exposure of the coating layer to both the longer wavelengths and the shorter wavelengths of UV light. This may allow relatively rapid curing of thicker coating layers. For example, a colloidal suspension used to form coating layer 105 may include a BAPO type photoinitiator and one or more alpha hydroxyketone type photoinitiators, and the UV curing process may include exposing the coating layer to UV/near visible light in the range of 350-450 nm (BAPO type photoinitiator) for deeper curing and UV light in the region of 210-350 nm (alpha hydroxyketone type photoinitiator) for surface curing. In some examples, one or more UV absorbers may be included in coating layer 105 to increase weatherability of the coating layer.

UV light sources that can be used for curing of the coating layer include, but are not limited to, an electrodeless UV lamp, an H-type bulb, a D-type bulb, a V-type bulb, an F-type bulb, and a light emitting diode (LED). For example, an LED array that emits light in the region of 350-430 nm can be used to cure a coating layer that includes a BAPO type photoinitiator. Alternatively, one or more LED sources may be used in combination with another UV light source, such as an electrodeless UV lamp, to cure the coating layer.

Figure 2:
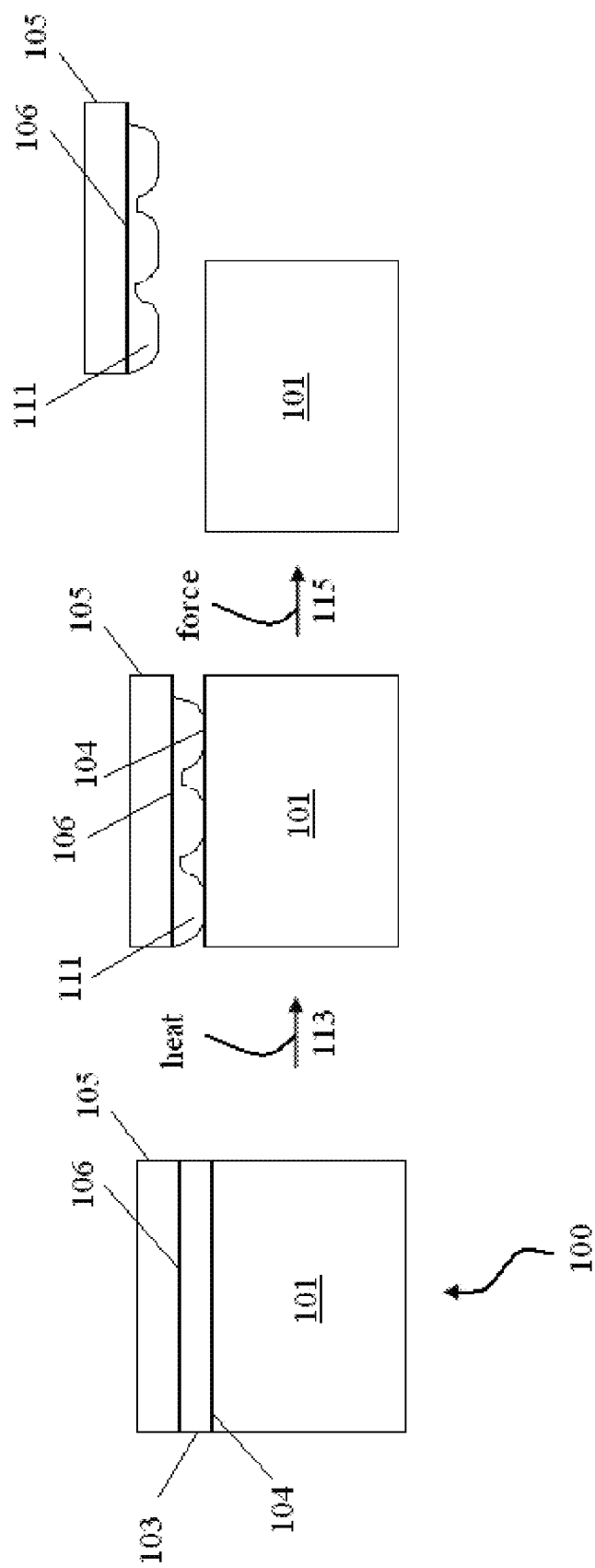
FIG. 2 is a block diagram of a coating removal process for the coated thermoplastic article of FIG. 1.

FIG. 2 illustrates a removal process for removing the coating layer from the coated thermoplastic article of FIG. 1, in accordance with various embodiments of the present disclosure. Removal of coating layer 105 and some or all of supramolecular polymer interface layer 103 from coated thermoplastic article 100 may allow thermoplastic object 101 to be recycled.

In the illustrated example, the melt temperature of thermoplastic object 101 may be greater than the melt temperature of supramolecular polymer interface layer 103. Heat may be applied to coated thermoplastic article 100 or to any one or more of coating layer 105, supramolecular polymer interface layer 103, and thermoplastic object 101 (heating process indicated by arrow 113). The heating process may increase the temperature of supramolecular polymer interface layer 103 to a temperature that is above the melt temperature of supramolecular polymer interface layer 103 but below the melt temperature of thermoplastic object 101. Optionally, a heat transfer agent may be applied to supramolecular polymer interface layer 103 to accelerate heating during the removal process. The heat transfer agent may be, for example, a laser. In one example, supramolecular polymer interface layer 103 may include gold nanoparticles or other solids that become heated upon exposure to the laser or other forms of electromagnetic radiation.

As supramolecular polymer interface layer 103 approaches its melt temperature, it may undergo a change from a first phase (a solid phase) to a second phase (a low-viscosity oil, a gel, or a softer solid phase) due to the disruption of noncovalent intrachain bonds. The disruption of these noncovalent bonds may degrade the main chains of the supramolecular polymer and help to disrupt bonding between supramolecular polymer interface layer 105 (i.e., melted supramolecular polymer interface layer 111) and thermoplastic object 101 along bonding interface 104.

Melted supramolecular polymer interface layer 111 may separate partially or completely from thermoplastic object 101 along bonding interface 104 as a result of the phase change. This may result in a partial or complete separation of coating layer 105 from thermoplastic object 101. In some examples, melted supramolecular polymer interface layer 111 may remain partially or fully coupled to coating layer 105 along bonding interface 106 due to the bonding of the alkoxy groups of the supramolecular polymer to coating layer 105. In other examples, melted supramolecular polymer interface layer 111 may be a low-viscosity oil that separates fully or partially from coating layer 105.

Force may also be applied to enhance or aid the removal of coating layer 105 from coated thermoplastic article 100 (application of force indicated as arrow 115). Force may be applied in various forms such as mechanical agitation (e.g., vibration, sonication, or tumbling) or peeling. The combination of applied heat and force may cause the release of coating layer 105 from coated thermoplastic article 100. The applied heat and force may also remove some or all of melted supramolecular polymer interface layer 111 from thermoplastic object 101. In some examples, melted supramolecular polymer interface layer 111 may be a soft solid or semi-solid that remains at least partially coupled to coating layer 105, and the combination of heat and force may cause supramolecular polymer interface layer 111 and coating layer 105 to detach from thermoplastic object 101 as a single unit.

In one example, coated thermoplastic articles may be tumbled within a rotating, shaking, or vibrating container. A heated fluid such as air or water may be added to the container before/during the tumbling, and the combination of heat and mechanical force may induce the removal of coating layer 105 and some or all of melted supramolecular polymer interface layer 111 from thermoplastic object 101. In other examples, heat and force may be applied sequentially, such as by exposure to laser energy and subsequent agitation or peeling.

Figure 3:
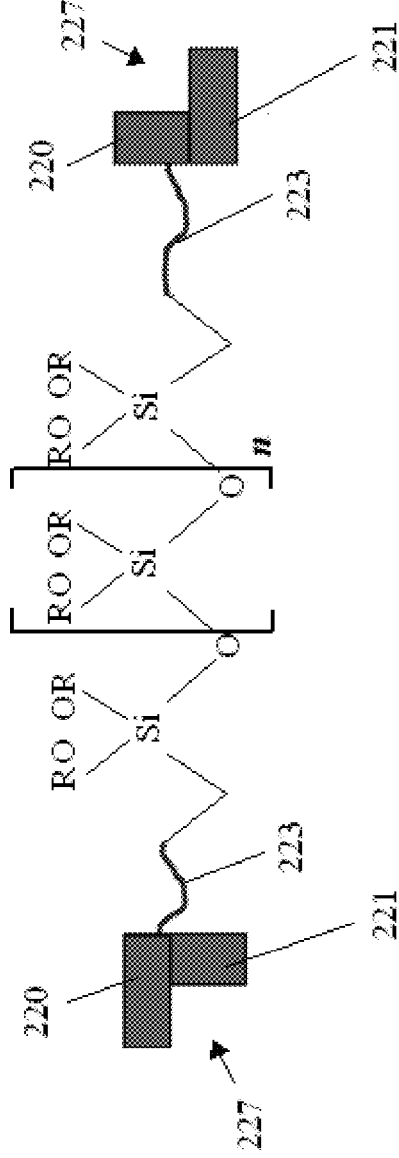
FIG. 3 is a diagram of a functionalized monomer.

FIG. 3 illustrates one example of a functionalized monomer that may be used to form a supramolecular polymer interface layer, in accordance with embodiments of the present disclosure. As illustrated, a functionalized monomer may have a flexible linker 223, which in turn may include one or more alkoxy groups 225. In this figure, one alkoxy group 225 is indicated by brackets. Alkoxy groups 225 may be silicon alkoxy groups and flexible linker 223 may be an organic chain, such as a hydrocarbon or derivative thereof. "R" may be selected independently from among hydrogen, hydroxy, methyl, ethyl, propyl, octyl, phenyl, or other alkoxy moieties. The number ("n") of alkoxy groups 225 in a functionalized monomer may be 3-10, 5-15, 10-20, or 10-50. Specific examples of "n" include 3, 4, 5, 6, 7, 8, 9, 10, 11, 12, 13, 14, 15, 20, 25, 30, 35, 40, 45, 50, and ranges between any two of these values.

End groups 227 may be bound to one or both ends of flexible linker 223. In some examples, end groups 227 may include a first subunit 221 coupled to a second subunit 220. Examples of end groups 227 include, but are not limited to, 2-ureido-4[1 H]-pyrimidinone (UPy) and 2,6-bis(1'-methylbenzimidazolyl)pyridine (Mebip). In this example, the end groups are 2,6-bis(1'-methylbenzimidazolyl)pyridine (Mebip) ligands. Supramolecular assembly of the monomers occurs upon addition of $Zn(NTf_2)_2$ which binds to the termini and links the functionalized monomers, resulting in polymerization ($NTf_2$ is bistriflimide).

Figure 4:
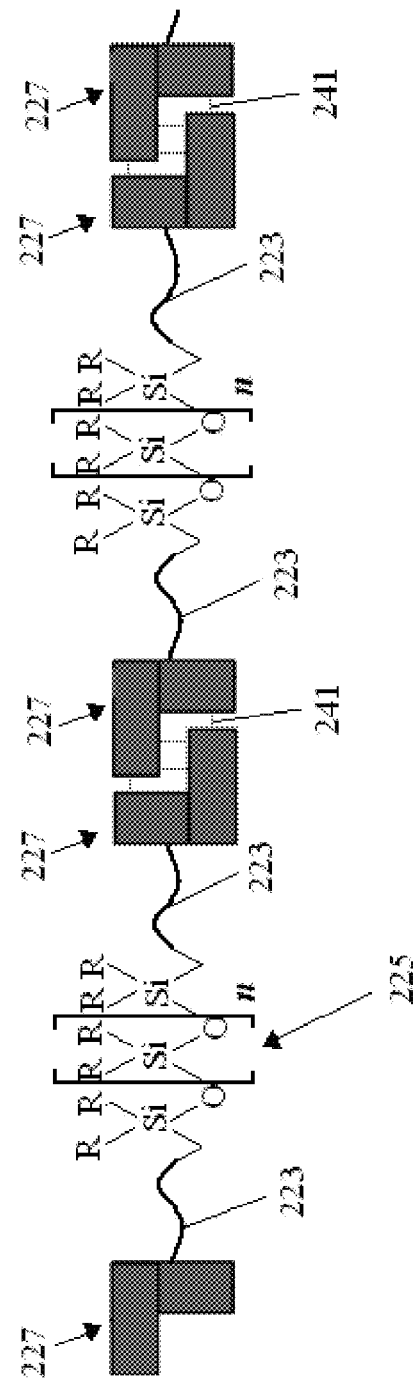
FIG. 4 is a diagram of a noncovalent interaction between functionalized monomers within the main chain of a supramolecular polymer.

As illustrated in FIG. 4, end groups 227 of the functionalized monomers may bond noncovalently to one another to form a main chain of a supramolecular polymer. In this example, four hydrogen bonds 241 may be formed between end groups 227 (e.g., UPy end groups) to directly link two self-complementary functionalized monomers of the main chain. Alternatively, end groups 227 of functionalized monomers may be linked via coupling molecule, such as a bistriflimide ($NTf_2$)-containing unit, that binds to an end group of a first monomer and an end group of a second monomer. For example, end groups 227 can be 2,6-bis(1'-methylbenzimidazolyl)pyridine (Mebip) ligands, and the coupling molecule can be $Zn(NTf_2)_2$.

Alkoxy groups 225 may bind to a silica coating, such as coating layer 105. However, flexible linker 223 does not bind to the coating or to the underlying thermoplastic object 101. When the supramolecular polymer is heated (e.g., to a temperature between the melt temperature of the supramolecular polymer and the melt temperature of thermoplastic object 101), flexible linkers 223 may allow noncovalently-bonded end groups 227 to disassociate, resulting in the degradation of bonding interface 104. In other examples, five, six, seven, eight, or more than eight hydrogen bonds and/or other types of noncovalent bonds may be formed in various combinations between end groups of two functionalized monomers.

Figure 5:
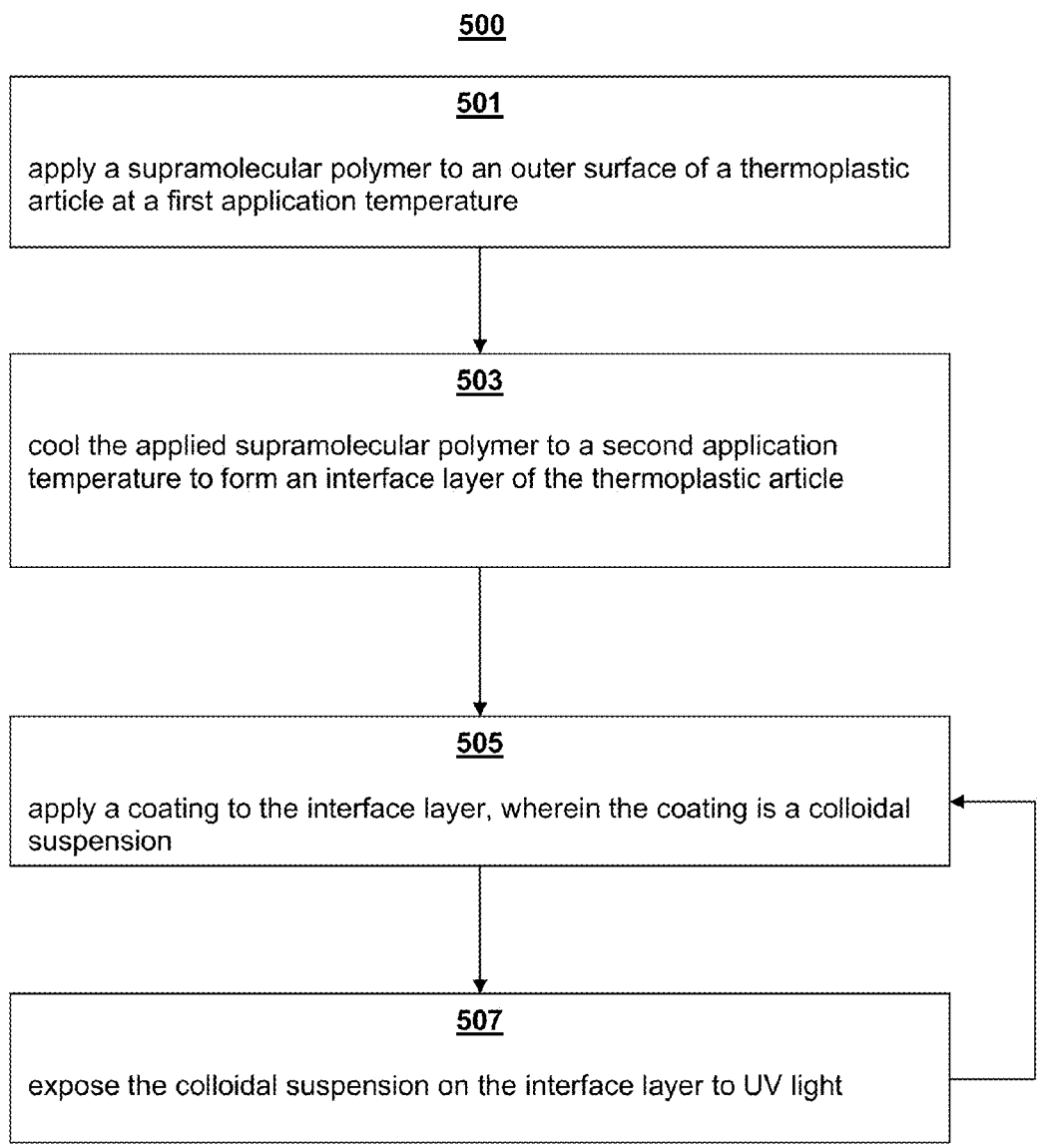
FIG. 5 illustrates a method for making a coated thermoplastic article with a removable coating.

FIG. 5 illustrates a method for making a coated thermoplastic article with a removable coating, in accordance with various embodiments of the present disclosure. Method 500 illustrates one or more operations, functions, or actions as illustrated by one or more of blocks 501, 503, 505, and/or 507. It will be appreciated that in some examples, various blocks may be eliminated, divided into additional blocks, and/or combined with other blocks.

Method 500 may start at block 501. At block 501, a supramolecular polymer may be applied to an outer surface of a thermoplastic object at a first application temperature. The first application temperature may be equal to or greater than the melt temperature of the supramolecular polymer. The supramolecular polymer may include a plurality of monomers with at least one flexible linker and an alkoxy group. As described above, the supramolecular polymer may be applied as a liquid, gel, or semi-solid by any suitable method such as spraying, dipping, spin-coating, rolling, meniscus coating, and/or flow coating. The application of the supramolecular polymer may include pre-treating the thermoplastic object with alcohol, water, or other cleaner. Alternatively, the thermoplastic object may be sanded or abraded along one or more surfaces before application of the supramolecular polymer in order to enhance adhesion. In some examples, the thermoplastic object may have a melt temperature that is higher than the melt temperature of the supramolecular polymer.

From block 501, method 500 may proceed to block 503. At block 503, the applied supramolecular polymer may be cooled to a second application temperature lower than the melt temperature of the supramolecular polymer to form an interface layer of the thermoplastic object. The applied supramolecular polymer may be passively cooled by allowing the coated thermoplastic object to remain stationary until the interface layer forms (i.e., until the applied supramolecular polymer solidifies). Alternatively, the cooling of the applied supramolecular polymer may be expedited by refrigeration, airflow (e.g., by directed airflow and/or by moving the coated thermoplastic object along a conveyor), and/or application of cooled fluids to the applied supramolecular polymer.

From block 503, method 500 may proceed to block 505. At block 505, a coating may be applied to the interface layer. The coating may be, or may include, an organic-inorganic hybrid coating. The coating may be applied to the interface layer as a colloidal suspension, which may include silica. In some examples, the coating may be applied as a liquid, gel, or semi-solid by any suitable method such as spraying, dipping, spin-coating, rolling, meniscus coating, and/or flow coating.

From block 505, method 500 may proceed to block 507. At block 607, the colloidal suspension on the interface layer may be exposed to UV light. The alkoxy groups of the supramolecular polymer in the interface layer may bond to the coating layer in response to UV light. In addition, UV light exposure may cause crosslinking, solidification, and/or hardening of the coating layer. Exposure to UV light may be followed by one or more additional treatments (e.g., cleaning with a solvent) or coating processes (e.g., addition of a second coating layer). Blocks 505 and 507 may be repeated to produce a multi-layered coating on the thermoplastic object.

Figure 6:
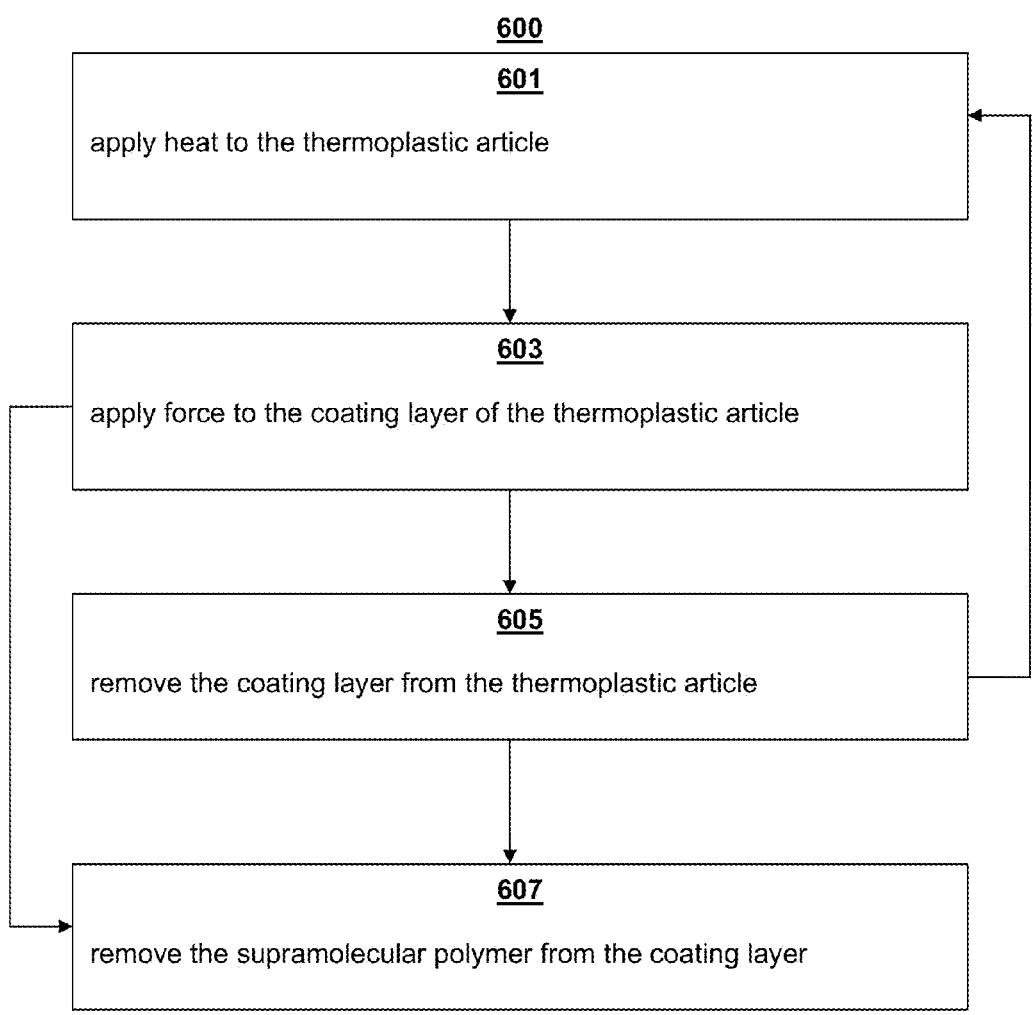
FIG. 6 is a flow diagram of a method for removing a coating layer from a coated thermoplastic article, all arranged in accordance with embodiments of the present disclosure.

FIG. 6 illustrates a method for removing a coating from a coated thermoplastic article, in accordance with some embodiments of the present disclosure. As described above, the coated thermoplastic article may include a coating layer, such as a hard silica coating, and a thermoplastic portion (i.e., a thermoplastic object). Further, a supramolecular polymer interface may be disposed between the coating layer and an outer surface of the coated thermoplastic portion. The supramolecular polymer interface may couple the coating layer to the outer surface of the thermoplastic portion. The thermoplastic object may have a first melt temperature, and the supramolecular polymer may have a second melt temperature that is lower than the first melt temperature.

Method 600 may start at block 601. At block 601, heat may be applied to the coated thermoplastic article. Applying heat may include heating the supramolecular polymer interface to a third temperature equal to or greater than the second melt temperature and less than the first melt temperature. In some examples, the supramolecular polymer interface may be heated by applying a heated fluid, such as a liquid or gas, to any portion of the coated thermoplastic article. Heated fluid(s) may be directed onto the coating (e.g., by jets of heated liquids). Alternatively, the coated thermoplastic article may be immersed, incubated, or otherwise exposed in its entirety to a source of heat. In other examples, heat may be applied to the coated thermoplastic article (or to the coating) in the form of radiation, such as electromagnetic radiation. This may be in the form of one or more laser beams. Alternatively, the electromagnetic radiation may be of another type, such as microwave radiation. One or more other heating methods may instead be used to heat the coated thermoplastic article, such as convection heating, conduction heating, steaming, or flaming. The supramolecular polymer interface may undergo a phase change in response to the applied heat, as described above. As a result, the "melted" supramolecular polymer interface may be in the form of a softer solid, a gel, and/or an oil.

From block 601, method 600 may proceed to block 603. At block 603, force may be applied to the coating layer of the coated thermoplastic article. Mechanical force may be applied to uncouple the coating layer and the supramolecular polymer interface from the outer surface of the thermoplastic portion. For example, the force may be applied to the coating layer along a plane of the supramolecular polymer interface. Alternatively, downward, lateral, upward, oblique, and/or shear forces may be applied, such as by repetitive applications of a movable part against the coating layer and/or coated thermoplastic article. Other types of force that may be used can include but are not limited to sound waves, pressurized fluid, and sliding/rotating compression. After the application of heat in block 601, the supramolecular polymer interface may be an oil, gel, or semi-solid, and application of force to the coating layer may be sufficient to uncouple the coating layer and the at least partially melted supramolecular polymer interface from the underlying thermoplastic object.

In some embodiments, blocks 601 and 603 may occur simultaneously. For example, force and heat may be applied to the coated thermoplastic article in a tumbler, shaker, sonicator, a vibration-inducing device, a shaker, or other agitation device that also applies heat to the coated thermoplastic article. The heat may be supplied as a heated liquid within the device, or the device may include one or more heating elements such as burners or heated coils. The force may be supplied in the form of collisions between the coated thermoplastic article and the interior of the device, collisions with other articles or objects within the device, or by fluid pressure or mechanical agitation. Once the coating layer and some or all of the at least partially melted supramolecular polymer interface layer have separated from the thermoplastic portion, the thermoplastic portion may be recycled.

In various embodiments, method 600 may proceed to block 605. At block 605, the coating layer may be removed from the thermoplastic portion. Some or all of the supramolecular polymer interface may be removed from the thermoplastic portion along with the coating layer. In some examples, after blocks 601 and 603 the coating layer and some of the supramolecular polymer interface layer may remain at least partially coupled to the thermoplastic portion. Therefore, removal of the coating layer and the supramolecular polymer interface layer may include a second application of heat and/or force, either by another device or by repeating blocks 601 and/or 603. Alternatively, the coating layer may be removed by directing a spray of heated and/or pressurized fluid against the coating layer.

In various embodiments, method 600 may proceed from block 603 or 605 to block 607. At block 607, the supramolecular polymer of the at least partially melted interface layer may be removed from the coating layer. This may be accomplished after removal of the coating layer (along with the supramolecular polymer interface) from the thermoplastic portion by reheating the coating layer and scraping, spinning, or otherwise agitating the coating layer to remove some or all of the remaining supramolecular polymer. Alternatively, remaining supramolecular polymer may be removed by washing the coating layer with a solvent. In some examples, washing the coating layer with a solvent and collection of the solvent may provide an opportunity to recover and reuse of at least some of the functionalized monomers and/or other components of the supramolecular polymer interface. Similarly, removal of the supramolecular polymer from the coating layer may allow the coating layer to be recycled. The coating layer, supramolecular polymer, and/or thermoplastic portion may be sorted according to various properties such as weight, shape, size, or solubility in a solvent.

EXAMPLES

Methods, systems, and articles described herein can be used to prepare thermoplastic articles with removable coatings and to subsequently remove such coatings. The following examples, which describe specific applications for automotive interior trim pieces, are provided merely by way of illustration and are not intended to be limiting. Removable coatings can also be applied to, and removed from, a wide variety of articles such as exterior automotive articles (e.g., plastic windows and bumpers), electrical and electronic components (e.g., casings of mobile wireless devices, computers, televisions, and household appliances), building materials, and numerous other articles.

A typical automobile includes approximately 44 lbs of coated plastic interior trim pieces. Types of plastics commonly used for these trip pieces include polypropylene (PP), acrylonitrile or acrylonitrile butadiene styrene copolymer (ABS), polybutylene terephthalate (PBT), polyethylene terephthalate, polycetals, and polyvinyl chloride (PVC). The interior trim pieces are coated to increase UV stability and impact resistance. Coatings may also be used to increase or reduce surface gloss, and to provide color. However, the removal of coatings applied by conventional methods is difficult, expensive, and may require the use of toxic chemicals.

Example 1

Preparation of an Automotive Interior Trim Piece Having a Removable Coating

A removable coating can be applied to a thermoplastic object, such as a cup holder for an automobile. In this example, the cup holder is manufactured from polypropylene by injection molding, and has a melt temperature of approximately 160° C.

Optionally, the cup holder may be cleaned prior to application of the removable coating. For example, the cup holder can be immersed in a solvent (e.g., methanol) within an ultrasonic cleaning apparatus. Ultrasonic energy may be applied for 5 minutes, and the cup holder may then be dried completely. Alternatively, the cup holder can be lowered into a solvent vapor for 5-40 minutes and subsequently moved to a drying area, where the solvent evaporates from the cup holder. Other organic solvents such as isopropyl alcohol, cyclohexane, ethanol, or acetone may be used instead of methanol. As another alternative, the cup holder may be immersed and agitated in an aqueous cleaning solution that includes a detergent and/or a wetting agent. The cup holder may optionally be rinsed in an aqueous or organic solution and dried.

A supramolecular polymer containing silicon alkoxy linkages (e.g., as shown in FIG. 4) may be heated to a first application temperature above the melting point of the supramolecular polymer, resulting in the formation of a low-viscosity solution. Alternatively, the low-viscosity solution may be prepared by adding functionalized monomers (e.g., as shown in FIG. 3) to a solvent. In this example, the melting point of the supramolecular polymer is within the range of 80° C. to 90° C., and the first application temperature is 120° C. At the first application temperature, the viscosity of the solution may be within the range of 1 to 3 Pa s.

The solution is applied to the outer surface of the cup holder at a thickness of 5 μm to 30 μm. The solution may be applied by spraying the solution onto the cup holder or by dipping the cup holder into the solution. The applied supramolecular polymer may then be cooled to a second application temperature (e.g., room temperature) that is below the melt temperature of the supramolecular polymer. As the solution cools, hydrogen bonding between end groups of functionalized monomers causes the solution to polymerize and solidify. This results in the formation of a supramolecular polymer interface layer on the outer surface of the cup holder.

An organic-inorganic hybrid coating material may be applied onto the supramolecular polymer interface layer. The coating material can be made from proportions of TEOS (tetraethoxysilane), MPTMA (3-(trimethoxysilyl)propyl methacrylate) and urethane acrylate (75.3, 22.6 and 2.1 weight percent, respectively) along with secondary components such as deionized water, hydrochloric acid, industrial methylated spirit and photoinitiator. The synthesis procedure of this hybrid coating is described in WO/2001/025343. Briefly, Component A is prepared by adding an intimate mixture of 32.4 g methanol, 2.9 g of distilled water and 0.2 g of 36% hydrochloric acid to 33.4 g of tetraethoxysilane (TEOS) in a beaker, mixing for 1 hour, adding 4.5 g of titanium isopropoxide, mixing at least 12 hours, adding 2.9 g of distilled water, stirring for 1 hour, and adding 0.57 g of distilled water. Component B is prepared by adding an intimate mixture of 5.9 g methanol, and 0.87 g distilled water and 0.2 g of 36% hydrochloric acid to 8.0 g of 3-(trimethoxysilyl) propylmethacrylate (MPTMA) in a beaker. Components A and B are then stirred separately, in sealed beakers, for approximately 30 minutes, after which they are combined and stirred for about 30 minutes in a sealed beaker. The resulting sol is then aged at room temperature for at least 24 hours in a sealed container to allow the development of the inorganic network. 7.2 g of distilled water is then slowly added to the solution. 90.0 g of the solution is then mixed with 0.8 g of UV-curable aliphatic urethane acrylate monomer (sold by Akcros chemicals under product code 260GP25) and 0.1 g of a mixture of 50% 1-hydroxycyclohexylphenylketone: 50% benzophenone as photoinitiator. The resulting solution can be stored in a sealed container in a dark area (e.g., a darkened storage cabinet) until use.

The solution is deposited onto the interface using an angled flow coating method where the final coating thickness is a function of the angle of the inclined substrate. After deposition the coating may be dried at 50° C. for 5 min and UV-cured for 10-20 minutes at a UV intensity of 46.3 mW cm$^2$ using an H-type bulb with no dichroic IR filter. In this example, the light source is a microwave-excited medium pressure mercury plasma light source. Such light sources are continuum UV sources, with the most important emission at approximately 366 nm. One feature of these light sources is a spectral continuum below 240 nm, part of which contributes to ozone ($O_3$) generation. Alternatively, the light source can include one or more light emitting diodes (LEDs).

Example 2

Preparation of an Automobile Instrument Panel Cover Having a Removable Coating

A removable coating may be applied to an automobile component that is constructed of polycarbonate, such as an instrument panel cover. The polycarbonate component may be cleaned with acetone after removal of any protective foil(s) or protective film(s). As described in Example 1, a supramolecular polymer containing silicon alkoxy linkages may be heated to its melting point, applied as a low-viscosity solution to the outer surface of the polycarbonate component to a thickness of 5 µm to 30 µm, and cooled to room temperature. As the solution cools, it solidifies to form a supramolecular polymer interface layer.

A sol-gel inorganic-organic hybrid coating is prepared by applying a mixture of a silicon precursor solution, titanium precursor solution and control formulation, as described for example by Karatas et. al., *Progress in Organic Coatings* 60:140-147 (2007). Briefly, the silicon solution is prepared by mixing 25.0 g tetraethylorthosilicate (TEOS), 3.85 g methanol, distilled water, and p-toluene sulfonic acid, which are allowed to partially hydrolyze for approximately 10 h at room temperature. The titanium precursor is prepared by dissolving titanium tetraisopropoxide (Ti(O-i-Pr)$_4$; 14.7 mL, 0.05 mol) and acetylacetone (acac; 5.2 mL, 0.1 mol) in 12 mL methanol and stirring for 10 h at room temperature to obtain a clear yellow Ti:acac solution. 1.8 mL distilled water (0.1 mol) and 0.04 g p-toluene sulfonic acid are then added to 24.0 g of Ti:acac, followed by partial hydrolysis for 10 h at room temperature.

A control formulation ("CF") is prepared by adding vinyl trimethoxysilane (2%), photomer 4006F (2%), methylmethacrylate (2%), Irgacure 184-819 mixture (3%) and BYK331 wetting agent (0.02 g) into the oligomer, epoxy acrylate (91%). The formulations of the organic-inorganic hybrid coating materials are then prepared from the CF (5.0 g) and varying amounts of the silica/titania precursor, depending on the desired sol-gel content. A wire gauged bar applicator is used to apply the mixture of silicon/titanium precursors and control formulation to obtain a wet thickness of 30 µm on the surface of the supramolecular polymer interface layer. The coating layer is hardened by applying UV light for 180 seconds using a medium pressure mercury lamp [120 W/cm, λmax: 365 nm (320-390 nm), total lamp power=3.24 kW] situated 15 cm above the substrate (radiation dose of 720 mJ/cm$^2$).

Alternatively, the coating can be prepared starting from a mixture of acrylates (component A) and a mixture of organosilanes (component B), as described by Wouters et al., *Progress in Organic Coatings* 51:312-320, (2004). Briefly, Component A is composed of 1,6-hexanedioldiacrylate (HDDA, UCB Chemicals) and an aliphatic polyurethane diacrylate in HDDA (EBC284, UCB Chemicals) at varying weight ratios. Component B is composed of a hydrolysis mixture of tetraethylorthosilane (TEOS, Aldrich, 98%) and 3-meth-acryloxypropyltrimethoxysilane (MPTMS, Aldrich, 98%). TEOS and MPTMS are allowed to hydrolyze in acidic water (pH 3) for a period of 16 h. The pH of the water is adjusted by the addition of acetic acid (HAc, Aldrich, 98%) or by the addition of the suspension of an intrinsically conductive polymer (ICP, Agfa Gevaert, 1.04 wt % suspension in water, stabilized at pH 2). Components A and B are mixed with a photoinitiator (2-hydroxy-2-methyl-1-phenyl-propan-1-one (Darocur 1173, Ciba Speciality Chemicals)), and the resulting mixture is applied to the supramolecular polymer interface layer. The coating layer is cured using an F-type lamp to deliver a radiation dose of 1375 mJ/cm$^2$.

As still another alternative, the coating can be prepared as described by Lee et. al., *Macromolecular Research* 18(1):40-46 (2010). Briefly, colloidal silica is treated with the silane coupling agent for surface modification and compounded with organic materials and the initiator to make the organic-inorganic coating solution. A colloidal silica solution with colloidal silica 15 nm in size (3.81 g of SiO2 in 8.89 g of methanol) is added to 77.6 g of isopropyl alcohol at room temperature and mixed with a mechanical stirrer. 7.48 g of methacryloxy propyl trimethoxy silane (MAPTMS), a silane coupling agent, is added by dropping for an hour. The reaction temperature is raised to 70° C. and a coupling reaction is performed for 3 h in a stirred reactor. In order to prevent the solidification, gelation and coagulation of particles, difunctional 1,6-hexanedioldiacrylate (HDDA) and trifunctional trimethylol propane triacrylate (TMPTA, MIRAMER M300) are added as reactive diluents to control the viscosity of the coating solution. Solvent and unreacted MAPTMS remaining after the coupling reaction are removed by vacuum distillation at 70° C.

The organic materials—difunctional urethane acrylate (MIRAMER PU-280, 50 wt %)/HDDA (25 wt %)/TMPTA (25 wt %)—are mixed with colloidal silica and photoinitiator(s) (1-hydroxycyclohexylphenylketone (HCPK, Irgacure 184), phenyl glyoxylic acid methyl ester (PGAME, Darocur MBF), and 2-methyl-1[4-(methylthio) phenyl]-2-morpholino-propan-1-one (MMMP, Irgacure 907)) at room temperature for 5 h to form the coating solution. Optionally, the coating solution may be subjected to ultrasonication for 30 min to enhance mixing efficiency.

The substrate may be cleaned by an ultrasonic cleaning process for 5 min in methanol and completely dried before use. The coating solution is dropped onto the substrate, followed by spin coating for 30 sec at 1,500 rpm. Solution coated substrates are UV-cured for 2 min at 800 W by using a high pressure mercury lamp with a light intensity of 40 mW/cm2 at 365 nm.

In this example of a coating layer, three photoinitiators with different absorption bands are used in order to utilize a wider range of UV wavelengths for curing. Other coatings may include one photoinitiator, two photoinitiators, or more than three photoinitiators.

Example 3

Removal of a Coating Layer from a Coated Automobile Cup Holder Using Heat and Mechanical Force As described above, a coated thermoplastic article such as an automobile cup holder may have a supramolecular polymer interface layer disposed between a surface of the underlying thermoplastic object and the coating. The coating can be removed from the automobile cup holder by heating the supramolecular polymer interface layer and applying mechanical force. The supramolecular polymer interface layer can be heated by convection, conduction or radiation to a coating removal temperature (the "third temperature") that is equal to, or greater than, the melt temperature of the supramolecular polymer interface layer (the first melt temperature) but less than the melt temperature of the thermoplastic object (the second melt temperature). The heat may be applied to the entire coated article, such as by placing the coated article into an oven, a furnace, or a container of heated liquid/gas. Alternatively, the heat may be applied to the coating layer by pressing with a heated roller, plate, or mold.

The coating removal temperature may be less than the first application temperature (i.e., the temperature at which the supramolecular polymer interface layer was applied to the thermoplastic object). For example, the first melt temperature may be 80° C., the first application temperature may be 120° C., and the coating removal temperature may be 90° C. to 115° C. The supramolecular polymer interface layer may form a semi-solid or relatively viscous liquid at the first application temperature. Alternatively, the coating removal temperature may be equal to, or greater than, the first application temperature. The supramolecular polymer interface layer may form a low-viscosity liquid at that temperature. The coating removal temperature may be within a range of 50° C. to 60° C., 60° C. to 70° C., 70° C. to 80° C., 80° C. to 90° C., 90° C. to 100° C., 100° C. to 110° C., 110° C. to 120° C., 120° C. to 130° C., 130° C. to 140° C., 140° C. to 150° C., 150° C. to 160° C., 160° C. to 170° C., 170° C. to 180° C., 180° C. to 190° C., 190° C. to 200° C., 200° C. to 220° C., 200° C. to 250° C., 250° C. to 300° C., or 300° C. to 400° C., and may be selected based at least in part on the melt temperature of the thermoplastic object.

A mechanical removal method such as cutting, picking, sanding, scraping, hot-water jetting, or tumbling is also used to apply mechanical force to the coated article. The softening or melting of the supramolecular polymer interface layer minimizes the mechanical force required for removal of the coating layer, and may also minimize damage to the underlying thermoplastic object. The heat and mechanical force may be applied simultaneously, such as by tumbling coated articles in a chamber with a heated fluid such as water or air. Alternatively, the heat may be applied before the mechanical force, such as by conveying the coated articles through an oven and then through a stream of pressurized fluid. The application of mechanical force may cause the coating layer to separate from the thermoplastic object. Optionally, the coating layer or the thermoplastic object may be treated with one or more additional applications of heat and/or force as described above to remove any remaining portions of the supramolecular polymer interface layer.

Example 4

Removal of Coating Layer from a Coated Automotive Instrument Control Panel Cover Using Irradiation In this example, the supramolecular polymer interface layer of a coated article, such as an automotive instrument control panel cover, includes functionalized monomers with 2,6-bis(1'-methylbenzimidazolyl)pyridine (Mebip) end groups linked via $Zn(NTf_2)_2$. The functionalized monomers also include a chain of silicon alkoxy groups that are joined to the end groups via flexible linkers, such as hydrocarbon chains. The coating layer can be any of the transparent silica-containing coatings described above.

The transparency of the coating layer allows for removal of the coating by application of UV light. UV light is applied to the coating layer or coated article at a wavelength of 320-390 nm and an intensity of 950 mW $cm^2$ until the supramolecular polymer interface layer softens.

Optionally, mechanical force can be applied to the coated article during or after the application of UV light in order to enhance coating removal. The UV light and mechanical force may be applied simultaneously, such as by tumbling coated articles in a UV light-irradiated chamber. Alternatively, the UV light may be applied before the mechanical force, such as by conveying the coated articles through an array of UV lights and then through an array of high pressure water jets. The combination of UV light and mechanical force may cause the coating layer to separate from the thermoplastic object. Optionally, the coating layer or the thermoplastic object may be subsequently treated with heat and/or additional mechanical force as described above to remove any remaining portions of the supramolecular polymer interface layer.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A thermoplastic article with a removable coating, comprising:
    a thermoplastic object;
    a supramolecular polymer interface layer disposed on an outer surface of the thermoplastic object, wherein the supramolecular polymer interface layer has a first melt temperature and the thermoplastic object has a second melt temperature, the second melt temperature being greater than the first melt temperature; and
    a coating layer coated on the supramolecular polymer interface layer,
    wherein the supramolecular polymer comprises a plurality of monomers with at least one flexible linker and an alkoxy group coupled to the coating layer, or the coating layer comprises an organic-inorganic hybrid coating.

2. The thermoplastic article of claim 1, wherein the alkoxy group comprises a silicon alkoxy group.

3. The thermoplastic article of claim 1, wherein the thermoplastic object comprises a selected one of an automotive instrument panel cover, an automotive instrument control, or an automotive interior trim.

4. A method for making a thermoplastic article with a removable coating, the method comprising:
    applying a supramolecular polymer to an outer surface of a thermoplastic object at a first application temperature, wherein the supramolecular polymer has a melt temperature lower than the first application temperature;
    cooling the applied supramolecular polymer to a second application temperature lower than the melt temperature to form an interface layer of the thermoplastic object; and
    applying a coating to the interface layer,
    wherein the coating comprises an organic-inorganic hybrid coating, or the supramolecular polymer comprises a plurality of monomers with at least one flexible linker and an alkoxy group that bonds to the coating layer in response to exposure of the colloidal suspension on the solid interface to UV light.

5. The method of claim 4, wherein applying the coating includes applying a colloidal suspension to the interface layer.

6. The method of claim 5, wherein the colloidal suspension comprises silica.

7. The method of claim 5, further including exposing the colloidal suspension on the interface layer to UV light.

8. The method of claim 4, wherein applying the supramolecular polymer comprises spraying the supramolecular polymer at the first application temperature onto the outer surface of the thermoplastic object.

9. The method of claim 5, wherein applying the colloidal suspension to the interface layer comprises spraying the interface layer with the colloidal suspension.

10. The method of claim 4, wherein the thermoplastic object has a melt temperature higher than the melt temperature of the supramolecular polymer.

11. The method of claim 4, wherein the thermoplastic article comprises a selected one of an automotive instrument panel cover, an automotive instrument control, or an automotive interior trim.

12. A method for removing a coating layer from a coated thermoplastic article, the method comprising:
    applying heat to the coated thermoplastic article; and
    applying force to the coating layer of the coated thermoplastic article, wherein a thermoplastic portion of the coated thermoplastic article is coupled to a supramolecular polymer interface disposed between the coating layer and an outer surface of the thermoplastic portion,
    wherein the supramolecular polymer has a first melt temperature, and the thermoplastic portion has a second melt temperature that is higher than the first melt temperature,
    wherein applying heat comprises heating the supramolecular polymer interface to a third temperature equal to or greater than the first melt temperature and less than the second melt temperature;
    wherein applying heat to the coated thermoplastic article comprises applying electromagnetic radiation to the supramolecular polymer interface, and
    wherein the thermoplastic article comprises a selected one of an automotive instrument panel cover, an automotive instrument control, or an automotive interior trim.

13. The method of claim 12, wherein applying the electromagnetic radiation to the supramolecular polymer interface comprises exposing the coated thermoplastic article to one or more laser beams.

14. The method of claim 12, wherein applying heat to the thermoplastic article comprises applying a heated fluid to the coated thermoplastic article.

15. A method for removing a coating layer from a coated thermoplastic article, the method comprising:
    applying heat to the coated thermoplastic article; and
    applying force to the coating layer of the coated thermoplastic article, wherein a thermoplastic portion of the coated thermoplastic article is coupled to a supramolecular polymer interface disposed between the coating layer and an outer surface of the thermoplastic portion,
    wherein the supramolecular polymer has a first melt temperature, and the thermoplastic portion has a second melt temperature that is higher than the first melt temperature, wherein applying heat comprises heating the supramolecular polymer interface to a third temperature equal to or greater than the first melt temperature and less than the second melt temperature;

wherein applying force to the coating layer comprises applying mechanical force to uncouple the coating layer from the outer surface of the thermoplastic portion, and wherein applying heat and mechanical force to the coated thermoplastic article comprises tumbling the coated thermoplastic article in a heated chamber.

16. The method of claim 15, wherein applying force comprises applying mechanical force to the coating layer along a plane of the supramolecular polymer interface.

17. The method of claim 15, further including removing the coating layer and the supramolecular polymer interface from the thermoplastic portion.

18. The method of claim 17, further including removing the supramolecular polymer from the coating layer.

* * * * *

UNITED STATES PATENT AND TRADEMARK OFFICE
CERTIFICATE OF CORRECTION

| | | |
|---|---|---|
| PATENT NO. | : 8,771,462 B2 | Page 1 of 1 |
| APPLICATION NO. | : 13/383358 | |
| DATED | : July 8, 2014 | |
| INVENTOR(S) | : Sjong | |

It is certified that error appears in the above-identified patent and that said Letters Patent is hereby corrected as shown below:

On the Title Page, in Item (75), under "Inventor", in Column 1, Line 1, delete "CA (US)" and insert -- CO (US) --, therefor.

IN THE SPECIFICATION:

In Column 1, Lines 39-40, delete "scope, the" and insert -- scope. --, therefor.

In Column 1, Line 41, delete "disclosure" and insert -- The disclosure --, therefor.

In Column 4, Line 64, delete "der Weals'" and insert -- der Waals' --, therefor.

In Column 6, Line 27, delete "et. al," and insert -- et al, --, therefor.

In Column 6, Line 29, delete "et. al," and insert -- et al, --, therefor.

In Column 6, Line 33, delete "et. al.," and insert -- et al., --, therefor at each occurrence throughout the Specification.

In Column 9, Line 45, delete "interface layer 105" and insert -- interface layer 11 --, therefor.

In Column 16, Line 29, delete "SiO2" and insert -- $SiO_2$ --, therefor.

In Column 16, Line 63, delete "photoinitators" and insert -- photoinitiators --, therefor.

Signed and Sealed this
Thirtieth Day of December, 2014

Michelle K. Lee
*Deputy Director of the United States Patent and Trademark Office*